(12) United States Patent
Wilson et al.

(10) Patent No.: US 9,429,943 B2
(45) Date of Patent: Aug. 30, 2016

(54) ARTIFICIAL INTELLIGENCE VALET SYSTEMS AND METHODS

(71) Applicant: Florida A&M University, Tallahassee, FL (US)

(72) Inventors: Sihle K. Wilson, Tallahassee, FL (US); Ronald E. Benson, Tallahassee, FL (US)

(73) Assignee: FLORIDA A&M UNIVERSITY, Tallahassee, FL (US)

( * ) Notice: Subject to any disclaimer, the term of this patent is extended or adjusted under 35 U.S.C. 154(b) by 25 days.

(21) Appl. No.: 13/786,287

(22) Filed: Mar. 5, 2013

(65) Prior Publication Data

US 2013/0231824 A1 Sep. 5, 2013

Related U.S. Application Data

(60) Provisional application No. 61/606,691, filed on Mar. 5, 2012.

(51) Int. Cl.
*B60R 25/102* (2013.01)
*G05D 1/00* (2006.01)
*G05D 1/02* (2006.01)

(52) U.S. Cl.
CPC .......... *G05D 1/0088* (2013.01); *G05D 1/0246* (2013.01); *G05D 1/0274* (2013.01); *G05D 1/0278* (2013.01); *G05D 2201/0213* (2013.01)

(58) Field of Classification Search
CPC ............. G05D 1/0088; G08G 1/096716; G08G 1/16; G08G 1/143; G08G 1/146; G08G 1/22; G08G 1/164; G06F 3/0484; B60H 1/00757; G01C 21/34; G01C 21/3492; B60R 25/102; G07C 5/008; H04M 1/6505; B60N 2/2863; H04L 45/02

USPC ............. 701/23, 26, 533, 1, 2, 25, 301, 117; 340/932.2, 932.22; 348/148; 715/751; 455/567; 370/248; 707/10
See application file for complete search history.

(56) References Cited

U.S. PATENT DOCUMENTS 6,175,803 B1 * 1/2001 Chowanic .............. G01C 21/34 340/988
6,201,794 B1 * 3/2001 Stewart et al. ............... 370/248
(Continued)

OTHER PUBLICATIONS

BRAiVE Vehicle Capabilities. BRAiVE. [Online] Mar. 17, 2011. http://www.braive.vislab.it/index.php.
(Continued)

*Primary Examiner* — Yuri Kan
(74) *Attorney, Agent, or Firm* — Thomas | Horstemeyer LLP; Christopher B. Linder; Randy R. Schoen

(57) ABSTRACT

Various examples are described for an artificial intelligence valet system. In one example, among others, a distributed information sharing system can obtain route information associated with a geographic area and provide the route information to a user vehicle in response to a request. In another example, an autonomous user vehicle can receive a request to autonomously proceed to a user defined location; obtain route information; and determine a route to the user defined location using the route information. In another example, a collision avoidance system can determine if an object is in a path of travel of a vehicle based at least in part upon sensory data and maneuver the vehicle based at least in part upon an object determination. In another example, an accident reporting system can determine an occurrence of a violation of a vehicle; obtain recordings of the environment surrounding the vehicle; and report the violation.

20 Claims, 13 Drawing Sheets

(56) References Cited

U.S. PATENT DOCUMENTS

| | | | |
|---|---|---|---|
| 7,813,844 B2 | 10/2010 | Gensler et al. | |
| 8,634,980 B1* | 1/2014 | Urmson | G05D 1/0214 701/23 |
| 8,676,273 B1* | 3/2014 | Fujisaki | H04M 1/6505 379/142.06 |
| 2002/0019703 A1 | 2/2002 | Levine | |
| 2002/0095255 A1 | 7/2002 | Minowa et al. | |
| 2003/0009277 A1* | 1/2003 | Fan | G01C 21/3492 701/117 |
| 2003/0088344 A1 | 5/2003 | Oda et al. | |
| 2007/0005609 A1* | 1/2007 | Breed | B60N 2/2863 |
| 2010/0256836 A1* | 10/2010 | Mudalige | G08G 1/22 701/2 |
| 2011/0245993 A1* | 10/2011 | Goto | G08G 1/096716 701/1 |
| 2012/0083960 A1* | 4/2012 | Zhu | G05D 1/0214 701/23 |
| 2012/0105635 A1* | 5/2012 | Erhardt | B60R 25/102 348/148 |
| 2012/0188100 A1* | 7/2012 | Min | G08G 1/143 340/932.2 |
| 2013/0219294 A1* | 8/2013 | Goldman-Shenhar | G06F 3/0484 715/751 |

OTHER PUBLICATIONS

Autonomous Car—Freie Universität Berlin. Freie Universität Berlin Artificial Intelligence Group. [Online] Aug. 6, 2010. http://www.expo21xx.com/automation21xx/15795_st3_university/default.htm.

Knight Rider Online. [Online] May 11, 2011. http://knightrideronline.com/.

Larsson, Johan, Reactive navigation of an autonomous vehicle in underground mines. Licentiate Thesis, Orebro University, 2007.

TechOn. Small Robot Debuts to Help Realize Autonomous Car (Video).[Online, Jun. 11, 2009] http://techon.nikkeibp.co.jp/english/NEWS_EN/20090611/171601/[last accessed Jun. 7, 2011].

Dae-Min C., Rahul R., Chandan S., Will W. Obstacle Avoidance and Overtaking for Autonomous Rally Car. [Online] http://rip09.wikidot.com/obstacle-avoidance-and-overtaking-for-autonomous-rally-car [last accessed Jun. 7, 2011] .

Markoff, John. Google Cars Drive Themselves, in Traffic. New York Times [Online, Oct. 9, 2010]. http://www.nytimes.com/2010/10/10/science/10google.html?pagewanted=print [Last accessed Jun. 7, 2011].

Park, K. et al. Learning user preferences of route choice behaviour for adaptive route guidance (Abstract). Intelligent Transport Systems, IET. Jun. 2007, 1(2) 159-166.

Author unknown. Intelligent Autonomous System for Cars. [Online, Feb. 19, 2011]. http://www.docstoc.com/docs/71928553/Intelligent-Autonomous-System-for-Cars [last accessed Jun. 7, 2011].

Markelic, et al. Anticipatory Driving for a Robot-Car Based on Supervised Learning. In Pezzulo et al, Eds. Anticipatory Behavior in Adaptive Learning Systems Lecture Notes in Computer Science vol. 5499, 2009, pp. 267-282.

Huang, S. and Ren, W. Use of Neural Fuzzy Networks with Mixed Genetic/Gradient Algorithm in Automated Vehicle Control. IEEE Transactions on Industrial Electronics, vol. 46, No. 6, Dec. 1999.

Campbell, et al. Autonomous driving in urban environments: approaches, lessons and challenges. Phil. Trans. R. Soc. A (2010) 368, 4649-4672.

Lamon, et al. Mapping with an Autonomous Car. In Proc. of the Workshop on Safe Navigation in Open and Dynamic Environments at the IEEE/RSJ Int. Conf. on Intelligent Robots and Systems (IROS), Beijing, China, 2006.

* cited by examiner

ARTIFICIAL INTELLIGENCE VALET SYSTEMS AND METHODS

CROSS REFERENCE TO RELATED APPLICATIONS

This application claims priority to U.S. provisional application entitled "Artificial Intelligence Valet System" having Ser. No. 61/606,691, filed Mar. 5, 2012, the entirety of which is hereby incorporated by reference.

BACKGROUND

Modern technology has afforded the average man with several luxuries. Automobiles are one of the major developments in history. Smart car technologies such as free-ranging on grid navigation, as well as parking guidance and information systems, aid in the prevention of human error when drivers operate a vehicle.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
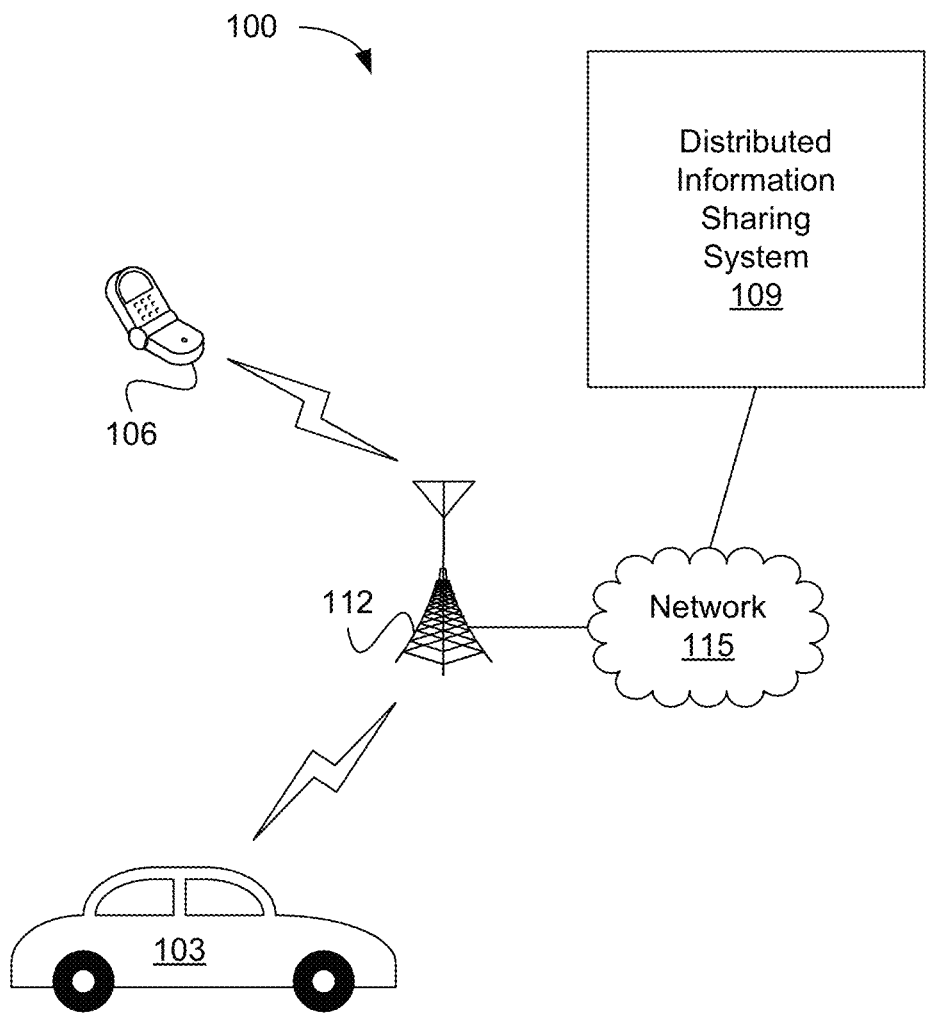
FIG. 1 is a graphical representation of various components of an artificial intelligence valet (AIV) system in accordance with various embodiments of the present disclosure.

Disclosed herein are various embodiments related to artificial intelligence valet systems and methods. Reference will now be made in detail to the description of the embodiments as illustrated in the drawings, wherein like reference numbers indicate like parts throughout the several views.

Automated cognitive and control techniques can be used to relieve drivers from the mundane moment-to-moment decision making involved in driving. In the case of autonomous vehicles, features such as automated pick-up and drop-off services and pedestrian detection and avoidance offer convenience and safety to the user of the vehicle. The artificial intelligence valet (AIV) system can include current mobile technology, fuzzy logic and neural networks that enable the vehicle to navigate to its user. While an autonomous vehicle is operating under AIV control, the AIV system can recognize when a collision with an object such as, e.g., a human, an animal, another car or any combination thereof is inevitable due to unforeseen situations. In response to such a determination, evasive actions can be initiated to intelligently avoid the collision or, in the worst case scenario, to decide which object to collide with if faced with an inevitable collision. This system can be implemented as a "plug in and play" item from off the shelf or via a retrofit sale process or it can be built into a new or existing vehicle. This system can be extended to not only park a vehicle but it can also be used by the user to navigate to a destination while the user is aboard the vehicle and the vehicle will be able to do so with no help from the user.

Additionally, autonomous vehicles can use global positioning system (GPS) technology to map routes. The AIV system can enable the vehicle to gradually learn driving patterns of the user. The AIV system continually learns the driving behaviors of its user, using artificially intelligence techniques, so that when the vehicle operates autonomously it can mimic driving patterns of the user such as, e.g., preferred speeds, closeness to the curb, closeness to the center painted line, avoidance of potholes or other obstacles, and/or regularly traveled route. In addition, a context-aware web service may be employed to allow drivers to communicate commands and relay information to the vehicle to improve the performance of their vehicle. The information may also be used by other vehicles and users of the AIV system. Any vehicle utilizing the AIV system can relay information about the roads they are traversing to aid in path planning.

Referring to FIG. 1, shown is a graphical representation of various elements included in the AIV system. For example, the AIV system 100 can include a vehicle 103, a user device 106, and a distributed information sharing system (DISS) 109, which include processing circuitry for implementing various features of the AIV system. In various embodiments, the processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. In yet other embodiments, the processing circuitry may include one or more software modules executable within one or more processing circuits. The processing circuitry may further include memory configured to store instructions and/or code that causes the processing circuitry to execute data communication functions.

The vehicle 103 and user device 106 can communicate via a wireless network 112 such as, e.g., a wireless local area network (WLAN) and/or cellular network. The vehicle 103 can include processing circuitry (e.g., a transmitter, receiver, and/or transceiver) to support the wireless communications. User devices 106 can include mobile processing systems such as, e.g., cellular telephones, tablet computers, e-readers, mp3 players, and portable media players such as, e.g., iPod touches and iPads. For example, the vehicle 103 and/or user device 106 may support cellular communications such as, e.g., a cellular data connection such as third-generation (3G), fourth-generation (4G), long term evolution (LTE), or other data communication standard. The vehicle 103 and/or user device 106 may support wireless communications such as, e.g., IEEE 802.11a/b/g/n (Wi-Fi). Processing circuitry of the vehicle 103 and user device 106 can also support GPS capabilities to determine their geographical location. The AIV system 100 can use applications that are independent of the user device platform or operating system (e.g., Android, iOS, webOS, Blackberry, Symbian, etc.) and/or the vehicle type, make, model, and manufacturer. Communication with the DISS 109 can be carried out via a network 115 (e.g., the Internet) that is communicatively coupled to the wireless network 112. The DISS 109 may be implemented as, e.g., a web service on a processing system such as one or more servers.

The AIV system 100 can provide various features such as, e.g., autonomous passenger retrieval, autonomous parking, intelligent collision avoidance, intelligent accident reporting, gradual intelligent route learning, remote cabin control, and/or distributed information sharing. Autonomous passenger retrieval can allow the vehicle 103 to independently retrieve its user. An application interface (or app) operating on the user device 106 may be used to request the vehicle 103 to collect the user at a specified location. The vehicle 103 may directly map routes and navigate without human intervention as well as travel according to user specifications such as, e.g., using previously recorded routes. In some embodiments, the vehicle 103 may include processing circuitry that can support the operation of the application interface. The DISS 109 can support the recording and storage of routes as well as routing evaluation and recommendations. Autonomous parking can allow the vehicle 103 to park itself after dropping off its user without further user input or control. The vehicle 103 may search out parking spots in the surrounding area as well as park in previously recorded parking areas or locations. The DISS 109 can support the recording and storage of parking areas. When used together, a vehicle 103 may be autonomously parked and retrieved by a user through the user device 106.

Intelligent collision avoidance can identify objects that are potentially in the path of the vehicle 103, thereby allowing the vehicle 103 to minimize potential injury and/or damage. Intelligent accident reporting can keep a user informed through the user device 106 of when a vehicle 103 is, e.g., touched, broken into, and/or hit by another vehicle. The user may define a level of vehicle interaction to determine when the user wants to be informed about incidents. When a collision or contact is detected, vehicle cameras may take pictures of the vehicle 103 and its surroundings and/or record audio and/or video around the time of detection. Gradual intelligent route learning can allow for driving patterns of the user to be learned and used by the vehicle 103 during autonomous operation.

Remote cabin control can allow the user to control settings and/or determine conditions of the vehicle 103 from the user device 106. For example, the user may be able to remotely operate windows, sun/moon roof, doors, trunk, side door mirrors, lights (e.g., cabin lights, exterior head lights, etc.), seat position and/or temperature, interior climate controls (e.g., air conditioning, heat, defogger and/or other model specific settings such as humidity), media devices (e.g., standard and/or XM radio, compact disc player, DVD player), and/or remotely start the vehicle 103. Control and/or status information may be communicated directly between the vehicle 103 and user device 106 via the wireless network 115 and/or through the DISS 109, which may store predefined control settings for the vehicle 103. The application interface may also allow the user device 106 to retrieve diagnostic information from the vehicle 103 for use by the user.

Distributed information sharing allows the AIV system 100 to use information shared by users of the system to improve recommendations for parking or routing of other vehicles, as well as other features of the AIV system 100. Shared information can include, but is not limited to, routes used by autonomous vehicles (including GPS route corrections), parking area locations, area parking patterns, reported instances of crime and/or vandalism, etc. Users of the AIV system 100 may use their user device 106 to share area information by submitting the information to the DISS 109, which may then meld the shared information with information from standard map navigation sources and intelligent transportation systems to assist all users of the AIV system 100. The DISS 109 can facilitate sharing of information between a vehicle 103 and a user device 106, as well as sharing the information with other users of the AIV system 100. For example, the shared information may allow a vehicle 103 to autonomously travel to a user or to parking spots more efficiently. Shared information may also allow an autonomous vehicle 103 to effectively operate within areas that were not previously visited by the user. Routing and/or parking suggestions may also be provided to assist a user who is manually operating the vehicle 103.

Figure 2:
FIGS. 2A-2C illustrate examples of screen shots of an application interface of the user device of FIG. 1 in accordance with various embodiments of the present disclosure.

A user interacts with the AIV system 100 through an application interface (or app) executed on a user device 106 of FIG. 1. An icon on the user device 106 may be selected to initiate a login screen as shown in FIG. 2A. After gaining access, the application interface provides various menu options for requesting features of the AIV system 100 such as, e.g., directions from one place to another for sharing parking locations. FIG. 2B illustrates an example of an options menu to request autonomous pick-up (or retrieval) of the vehicle 103 of FIG. 1, autonomous valet parking of the vehicle 103, real-time tracking of the vehicle location, sharing information, and queries regarding local information. Other screens may allow the user to select navigation based on the current location of the user device 106 and/or a desired parking area type (e.g., street, street level parking lot, or multilevel parking lot) as illustrated in FIG. 2C. For instance, in searching for directions a user may be able to utilize their current location or manually enter a location as their starting point. Another screen may be used for sharing the location of a parking area. It can prompt the user to enter a preset value that describes what 'type' of parking area the user is sharing the location of, whether street parking, ground-level parking lot, or multilevel parking structure.

The DISS 109 (FIG. 1) melds information from standard map navigation sources with shared user generated information. Information is shared by users of the AIV system 100 by sending information to a centralized repository of the DISS 109 using the application interface on their user device 106. The geolocation and networking capabilities of current mobile devices can be used to provide real-time information to the DISS 109. The AIV system 100 can then use the user information to determine locations that may be most likely to have parking spaces available at a certain time based on success rate data shared by users of the AIV system 100. The AIV system 100 is context aware, meaning it is aware of various factors related to its operation, and able to act upon that awareness. For example, the AIV system 100 may be aware of the GPS positioning of the user, the position of the user's destination, and the time, date, and day of the week in which shared locations have been used. When a user or an autonomous vehicle utilizes shared information from DISS 109 for navigating, the resulting usage data corresponding to that information is captured and saved by the DISS 109. For instance, the captured data can include whether or not open parking spaces were found at shared locations or how long it took to traverse a certain route, as well as the day and time when those usage instances occurred. All that contextual information can be used by the AIV system 100 to determine which location will be most likely to have free parking.

Requests, feedback, and information submitted by a user device 106 are relayed to the DISS 109. The DISS 109 can use a datastore to store and/or retrieve parking and route data shared by users of the AIV system 100, as well as data on the context of the usage of that data. In order for the AIV system 100 to meld user submitted information with existing navigation information, the DISS 109 can use the coordinates of parking areas obtained from the data and a combination of user shared routes and routes from one or more map navigation source(s) to determine routing and/or parking information. Context information accumulated when a user navigates with the aid of the AIV system 100 may be used to determine which data to provide when the user makes an information request. When a user initiates a request from the user device 106, the application interface can retrieve origin and destination information, as well as the time and date of the request. That information is sent to the DISS 109, which can use the request information to determine the appropriate response to the request. Operation of the various components of the AIV system 100 may be understood by examples of functions offered by the system.

Figure 3:
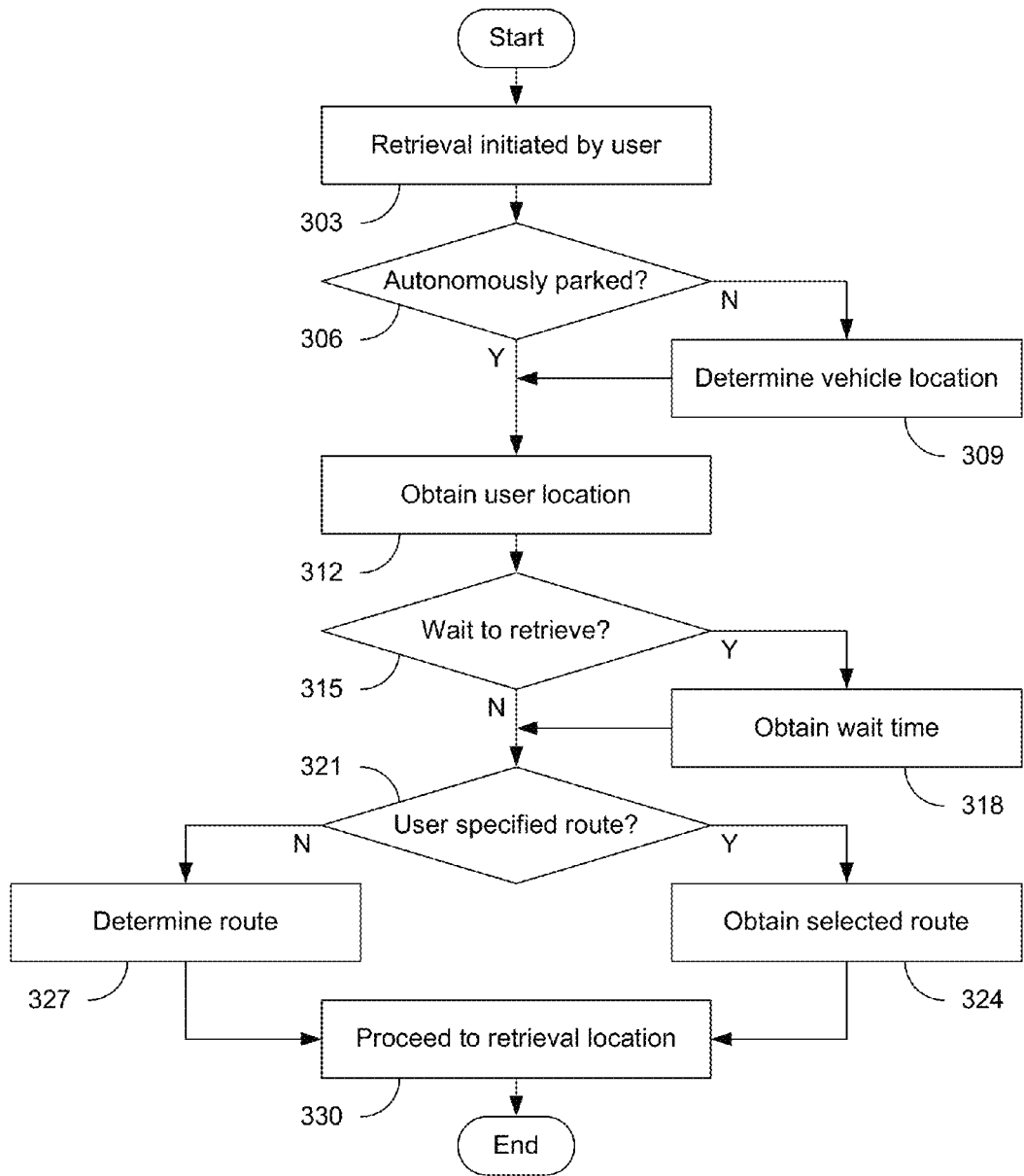
FIG. 3 is a flowchart illustrating an example of passenger retrieval by the AIV system of FIG. 1 in accordance with various embodiments of the present disclosure.

The AIV system 100 can provide for autonomous passenger retrieval by a vehicle 103 in response to a request by a user. Referring to FIG. 3, shown is a flowchart illustrating an example of a user request for autonomous pick-up by the vehicle 103 (FIG. 1). Beginning with 303, the user initiates the request to be retrieved through the application interface on the user device 106 (FIG. 1). For example, the user may select the "Pick Me Up" icon shown in FIG. 2B. In 306, it is determined whether the vehicle 103 was autonomously parked or parked by the user. If the vehicle 103 was autonomously parked by the AIV system 100, then the location of the vehicle 103 is known by the system (e.g., stored in a data store of the DISS 109 of FIG. 1). If the vehicle 103 was parked by the user, then the vehicle location can be determined in 309. For example, the application interface may request the user to provide the parking location of the vehicle 103. The application interface may prompt the user to specify the type of parking the vehicle is in and then provide a selection list of possible parking areas based, at least in part, upon the indicated parking type. In some cases, the user may have already provided the parking location of the vehicle 103 to the DISS 109 at the time the vehicle 103 was parked. The parking location may have been sent by the user to the DISS 109 using the GPS capabilities of the user device 106. In other implementations, the vehicle location may be determined by the AIV system 100 based upon GPS information obtained from the vehicle 103 itself. In response to the retrieval request, the DISS 109 may request that the vehicle 103 provide it current geolocation.

In 312, the user location for retrieval or pick-up is obtained by the DISS 109. For example, the current geolocation of the user device 106 may be sent to the DISS 109 as used as the retrieval location. The application interface on the user device 106 may prompt the user to determine if the current location should be used for pick-up or whether the user wishes to specify a different retrieval location. In 315, the application interface may also prompt the user to determine if the retrieval should be delayed. If yes, then the wait time is obtained in 318. The wait time may be specified by the user as an amount of time to wait (e.g., 20 minutes) or as a specific pick-up time (e.g., 10:30 pm).

In 321, the application interface may also prompt the user to determine if the user wants the vehicle 103 to travel by a specified route. If so, then the desired route is obtained from the user through the user device 106 in 324. For instance, the application interface may provide a route mapping feature to allow the user to select the desired route. In some cases, the route may be selected from a list of one or more preferred routes of the user that have been learned through the gradual intelligent route learning of the AIV system 100. If the user does not want to specify a route to the retrieval location, then the DISS 109 determines a route for the autonomous retrieval of the user in 327. The routing may be based, at least in part, upon information from map navigation sources, shared user information, and other available information such as traffic patterns, construction, time of day, etc. The DISS 109 may also modify or adjust the user selected route of 324 based upon the shared user information and the other available information.

In 330, the vehicle 103 autonomously travels to the retrieval location to pick-up the user. The departure takes into account any specified wait time, as well as travel time based upon the shared user information and other information available from navigation and/or other traffic monitoring sources. The application interface of the user device 106 may provide a route mapping feature to allow the user to track the location of the vehicle 103 in real-time using the GPS capabilities of the vehicle 103. Traffic conditions and locations such as, e.g., red lights and speed cameras may also be indicted as part of the mapping feature. The AIV system 100 can also provide a failsafe backup for when the user device 106 is not available for use such as when the user device 106 loses reception or when battery power is no longer available. The user may be able to contact the AIV system 100 using another device to initiate a retrieval request. For example, the user may login to the AIV system 100 (or the vehicle 103) by calling a backup number on another telephone or using a web application interface. The user's identity may then be verified by, e.g., entering a passcode and/or other information. The vehicle 103 may then autonomously return to the drop-off location to wait for the user. Routing may be determined by the DISS 109 based upon the parking location of the vehicle 103 and the stored drop-off location.

Figure 4A:
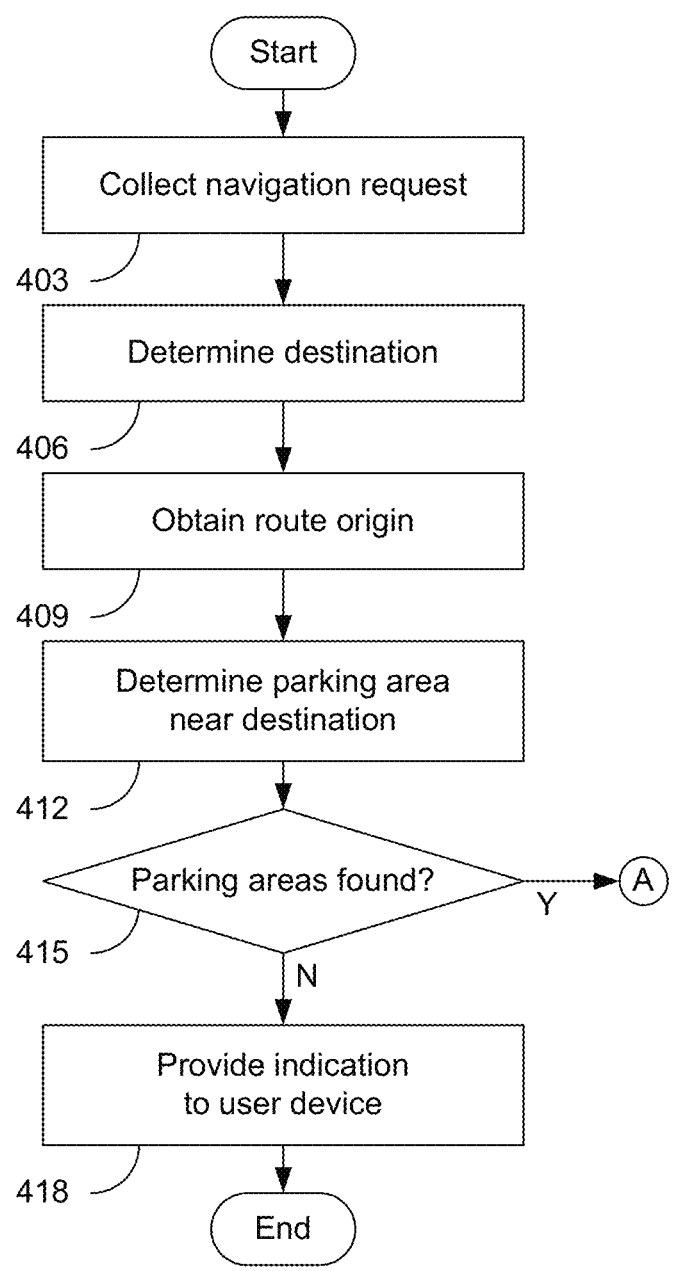
FIGS. 4A and 4B show a flowchart of an example of navigation to a parking area by the AIV system of FIG. 1 in accordance with various embodiments of the present disclosure.
Figure 4B:
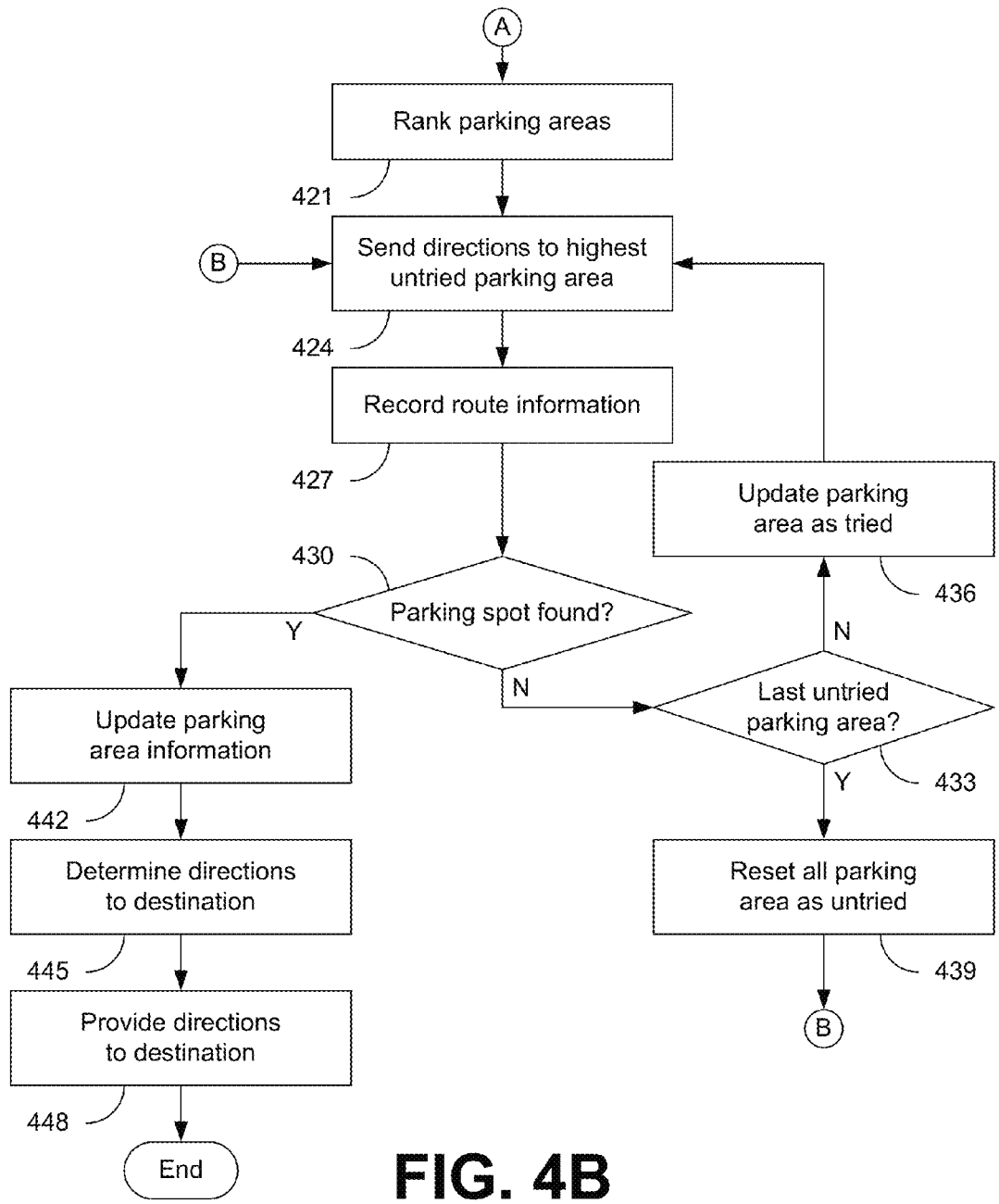

The AIV system 100 can also provide assistance to the user for manual and/or autonomous parking of the vehicle 103. Referring next to FIGS. 4A and 4B, shown is a flowchart illustrating an example of navigation to a parking area by the AIV system 100 (FIG. 1). Beginning with 403 of FIG. 4A, the user initiates a request for parking assistance through the application interface on the user device 106 (FIG. 1), e.g., by selecting an icon of the application interface. The application interface may request the user to provide a destination in 406 and the route origin in 409. For example, the destination may be a drop-off destination for autonomous parking of the vehicle 103 (FIG. 1) or it may be a final destination with the user manually parking the vehicle 103 in one of the recommended parking areas. The user may also specify, through the application interface, other search requirements such as, e.g., the type of parking to use or an allowable walking distance from the destination. The route origin may be input by the user through the application interface or may be determined using GPS capabilities of the user device 106. The destination and origin information are provided by the user device 106 to the DISS 109 (FIG. 1) in 406 and 409, respectively.

In 412, the DISS 109 determines parking areas that are within a predefined distance of the destination. The AIV system 100 can utilize stored user submitted information with existing navigation information from one or more map navigation source(s) to determine potential parking areas. In addition to using its own crowd sourced information on possible parking locations, the DISS 109 may also communicate with smart parking lots and/or garages in the area and query them for open parking spaces. If no parking areas are determined to near the destination (e.g., within a defined distance or radius from the destination) in 415, then the DISS 109 provides an indication to the user device 106 for notification of the user. The user may begin again by defining a different destination and/or changing the distance from the destination.

If one or more parking areas are found in 415, then the parking areas are ranked in 421 of FIG. 4B. In the event that the datastore contains more than one possible parking area near the destination, the different parking areas can be ranked or scored according to various factors such as, e.g., distance from destination and average success rate in finding parking in the area. To determine the success ranking of a parking area, the date of the request is taken, and then the current time is used to determine the time frame in which the request has been made. The DISS 109 base the evaluation on daily time frames, e.g., "morning" between 12:00 AM and 11:00 AM, "afternoon" between 11:00 am and 5:00 PM, and "night" between 5:00 pm and 12:00 am. After the parking areas within the desired area are determined in 412 of FIG. 4A, the datastore can be queried for each area's success data.

The rankings of the parking areas may be determined in 421 of FIG. 4B using a curved grading system. The area with the greatest success rate at the time and date in question receives the highest grade, with its success percentage curving upwards to 100 for its success ranking. The difference between that highest ranked area's percentage and 100 is then used as the offset used to calculate (or normalize) the grades for the other areas. In the event a given area doesn't have data for the requested timeframe on the requested day of the week, the DISS 109 may compensate first by determining whether the requested day is a weekday (Monday through Friday) or a weekend day (Saturday or Sunday). After that determination, if the requested day is a weekday, then the average success for the requested timeframe on weekdays is used as the success percentage. A predefined grade penalty (e.g., 7 points) may be subtracted from the area's grade. If no data exists for an area during the same portion of the week as the requested day, then average success for the area, regardless of day and time is used, and a larger grade penalty (e.g., 15 points) is subtracted from that area's grade. Distance rankings may be evaluated based upon the distance of the area closest to the destination (i.e., the "100%" value), and then the grades of the other areas are calculated according to the percentage by which they are farther from the destination than the closest area.

The grades of each parking area can be combined to give the area a score. In some implementations, the success rate is weighted to count for two grades and the combined score is then divided by three for the area's overall initial grade. To allow the DISS 109 to adapt to the dynamic nature of traffic and parking patterns in heavily populated areas, the DISS 109 may also check to see if an area has seen more or less success over the course of the current week. Examples of situations where there could be a temporary but dramatic spikes or drops in traffic include, but are not limited to, whether a convention has come to an area or it is spring break on a local college campus. If the weekly trend varies 25% or more from previous averages, a predefined modifier (e.g., +/−0.35) can be applied to the area's grade.

Routing directions to whichever parking area has the highest resulting grade will be the sent to the user device 106 in 424. The process for determining the best route to the recommended parking area is similar to that for determining the ranking of the parking areas. The DISS 109 can begin by searching its datastore for routes that will take the user within half a mile of his or her location. The routes may then be ranked by the DISS 109 based upon one or more criteria. For example, the routes may be ranked based upon the average time the route takes on the day in question during the time period in question.

In the event that a potential route doesn't have data for the requested timeframe on the requested day of the week, the system may compensate by finding the average time taken for the route during that time on the part of the week the current day falls within, weekday or weekend. The time average for the route in this case may be inflated by a predefined amount (e.g., 7 percent) to account for the data found for the route not falling on the exact day requested. If no data exists for the route during the same portion of the week as the requested day, then the average success for the route, regardless of day and time can be used, and the time average for the route in this case will be inflated by a larger predefined amount (e.g., 15 percent). DISS 109 can also track trends for routes, and if a route has a weekly trend that varies by 25% or more from previous averages, a defined modifier (e.g., +/−20%) may be applied to the average. After the route averaging has been completed, the DISS 109 may query moe or more map navigation source(s) for the routes. Any routes found from the map navigation source(s) which haven't already been identified in the datastore can be added to the list of considered routes, and the expected time for the route supplied by the map navigation source may be used in place of an average time for its ranking among the routes found in the datastore. The DISS 109 may also communicate with intelligent transportation systems to obtain information on, e.g., incidents that may cause delays along one or more of the considered routes, such road closures, traffic jams, or traffic accidents. In such a case, the DISS 109 can apply a defined modifier to lower that route's ranking among the other considered routes. Whichever route has the lowest time will be the one suggested to the user and/or the autonomous vehicle 103.

After the routing directions have been provided in 424, in 427 the user device 106 and/or the vehicle 103 records route information (e.g., route time, speeds, etc.), which is sent to the DISS 109 for evaluation and storage in the data store.

The route information may be used to adjust recommendations by the AIV system 100. When the parking area is reached, it is determined in 430 whether a parking spot is found. The application interface on the user device 106 can allow the user to indicate that they did not find parking at that location. If a parking spot has not been found, then if the parking area is not the last untried parking area in 433, the current parking area is updated as tried and the flow returns to 424 where directions to the next highest untried parking area are sent to the user device 106 and/or the vehicle 103. If it is the last untried parking area, then all of the identified parking areas are reset to untried in 439 and the flow returns to 424 where evaluation of the parking areas begins again until the user has successfully parked. In the case of autonomous parking of the vehicle 103, the user may be dropped-off at the destination before the vehicle 103 begins to search the ranked parking areas.

When a parking spot is successfully found in 430, the user device 106 and/or vehicle 103 provides an indication to the DISS 109, which updates the parking area information in 442. If the vehicle 103 was autonomously parked, the parking area information may be stored by the DISS 109 until a request for retrieval is received from the user. If the vehicle 103 was parked by the user, then the application interface can be used to confirm that a parking spot was located and the user device 106 can send the parking area information to the DISS 109 for evaluation and storage. Walking directions to the specified destination may also be determined by the DISS 109 and/or user device 106 in 445 and provided to the user in 448 via the application interface of the user device 106. For instance, the application interface may provide a route mapping feature to allow the user to see the route to the destination.

Users of the AIV system 100 can share information with the DISS 109 in a variety of ways. For example, information may be sent from the vehicle 103 and/or user device 106 to the DISS 109 for evaluation and storage in a datastore. In addition, processing circuitry in the vehicle 103 can automatically learn a route the user repeatedly takes. A user can also train the system by specifying information through the application interface of the user device 106, which takes advantage of the geolocation capabilities of current mobile devices. For instance, the AIV system 100 can learn custom routes/shortcuts, parking locations, building drop-off locations, parking patterns, GPS route corrections, and location crime/vandalism reports, etc. using information submitted from the vehicle 103 and/or user device 106. A user may teach the AIV system 100 a custom route/shortcut by, e.g., telling the vehicle 103 and/or DISS 109 to record the route that the user is about to drive or by plotting or identifying the route in a route mapping function supported by the application interface of the user device 106.

Figure 5:
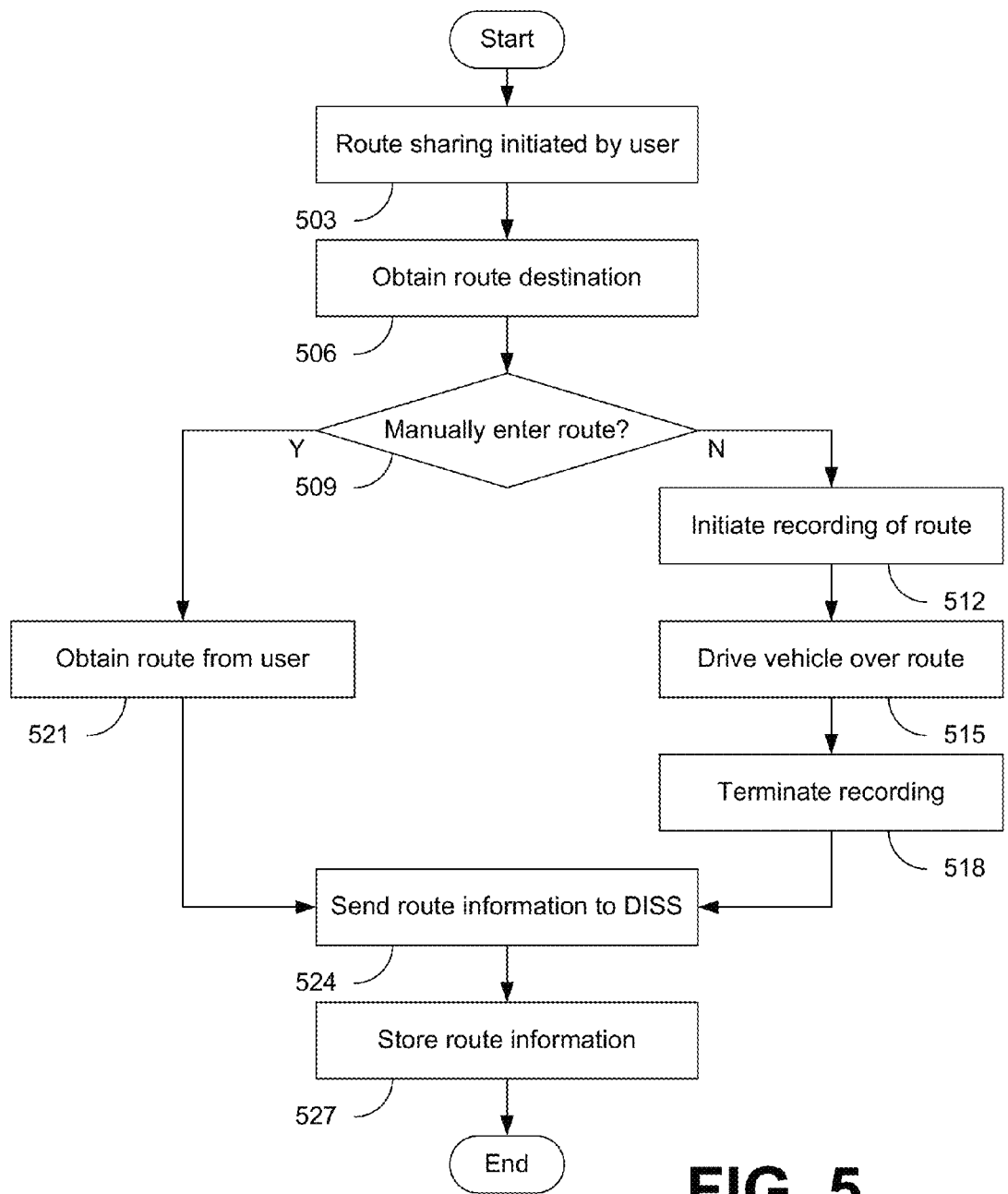
FIG. 5 is a flowchart illustrating an example of a user sharing route information with the AIV system of FIG. 1 in accordance with various embodiments of the present disclosure.

Referring now to FIG. 5, shown is a flowchart illustrating an example of a user sharing route information with the AIV system 100 (FIG. 1). Beginning with 503, the user initiates the route sharing through the application interface on the user device 106 (FIG. 1). For example, the user may select the "Teach & Share" icon shown in FIG. 2B and then share the route by selecting a corresponding icon. In 506, the route destination is obtained. For example, the user may be prompted to enter a destination address. A route name may also be requested for identification. In 509, it is determined whether the user will enter the route information through the application interface of the user device 106 or whether the vehicle 103 (FIG. 1) and/or user device 106 will record the route information while the user drives the vehicle 103.

If the route information is to be recorded by the user, then recording by the vehicle 103 and/or user device 106 is initiated in 512 by the user by, e.g., selecting an icon on the application interface. In some cases, the user device 106 communicates with the vehicle 103 to coordinate collection of route information by both the vehicle 103 and the user device 106. When the application interface indicates that the system is ready to record the route information, the vehicle 103 is then driven over the desired route in 515. The vehicle 103 and/or user device 106 can record information such as, e.g., position, time, speed, and direction using the GPS capabilities of the vehicle 103 and user device 106. Other route information may also be collected by other sensors installed in the vehicle 103. When the destination is reached, the recording is terminated in 518. The vehicle 103 and/or user device 106 may stop recording automatically when the GPS indicates that the destination has been reached or when the user terminates the recording through the application interface.

Otherwise, the user enters the route in 521 through the application interface. For instance, the application interface may provide a route mapping feature to allow the user to enter the route information. The recorded or manually entered route information is sent to the DISS 109 by the vehicle 103 and/or user device 106 in 524. The DISS 109 may then store the route information for subsequent access in 527. The stored route information may be used by the DISS 109 to evaluate potential routes for the vehicle 103. In some cases, the route information may be sent to the vehicle 103 for autonomous operation.

Figure 6:
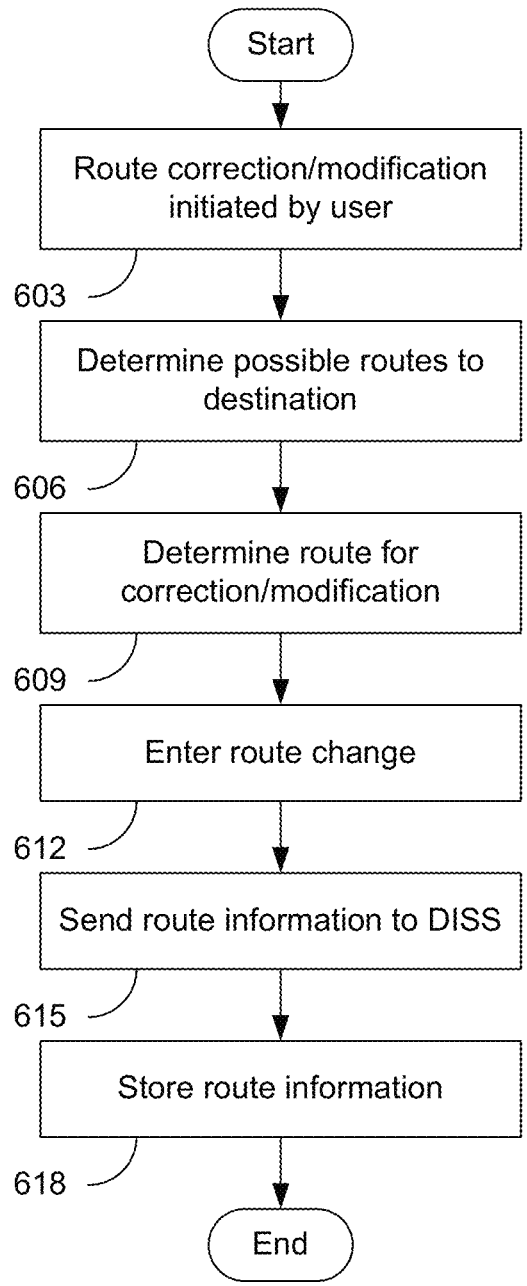
FIG. 6 is a flowchart illustrating an example of route correction or modification with the AIV system of FIG. 1 in accordance with various embodiments of the present disclosure.

Routing corrections may also be initiated and shared by a user of the AIV system 100. By importing a map route from an internet based navigation service such as, e.g., Google maps or Mapquest, the user can edit the route to correct inaccuracies or create a custom route. Referring now to FIG. 6, shown is a flowchart illustrating an example of route correction or modification with the AIV system 100 (FIG. 1). Beginning with 603, the user initiates the route correction or modification through the application interface on the user device 106 (FIG. 1). In 606, possible routes between a starting point (or origin) and a destination specified by the user are determined. The routes may be determined by one or more navigation services chosen by the user. The application interface retrieves and displays the possible routes on the user device 106. In 609, the user selects a route for correction or modification and the route information is loaded by the application interface into a route plotting map. The user then plots the route correction or modification in 612. Information about the route and/or the corrected route is sent to the DISS 109 (FIG. 1) in 615 and stored for subsequent access in 618. The corrected or modified route may be used by the DISS 109 and/or vehicle 103 to determine, e.g., user routing preferences for autonomous operation of the vehicle 103. This information can allow the AIV system 100 to do its job more effectively, being able to arrive to pick-up users or park more quickly, and further ensure the safety of both the vehicle 103 and its passenger.

Figure 7:
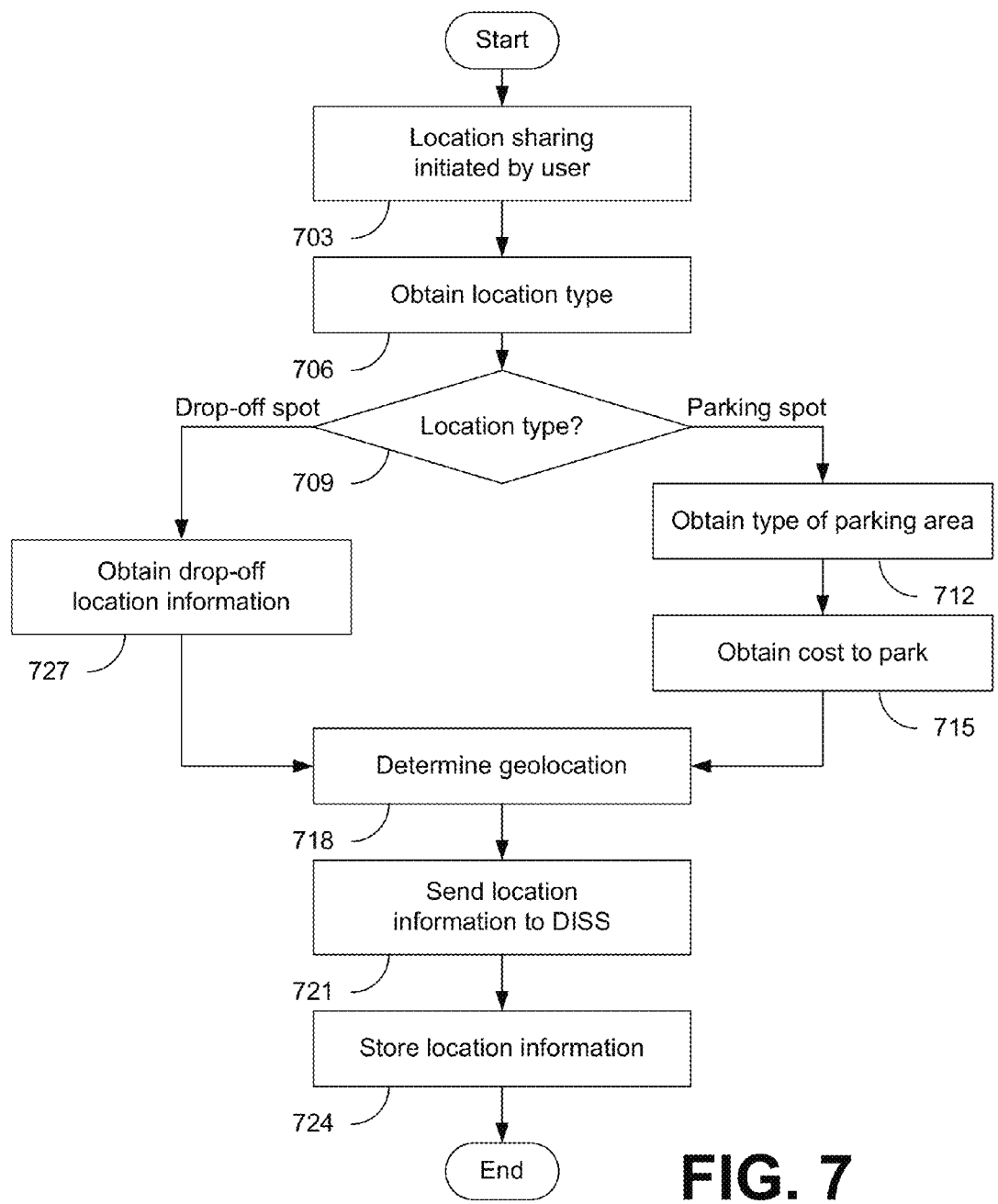
FIG. 7 is a flowchart illustrating an example of sharing information about a location with the AIV system of FIG. 1 in accordance with various embodiments of the present disclosure.

Location and area information may also be shared by users of the AIV system 100. Referring now to FIG. 7, shown is a flowchart illustrating an example of sharing information about a location with the AIV system 100 (FIG. 1). Beginning with 703, the user initiates sharing of location information through the application interface on the user device 106 (FIG. 1). In 706, the location type is entered by the user. In some implementations, the user may select one of a list of location types provided through the application interface of the user device 106. In the example of FIG. 7, the location types are either a drop-off location or a parking spot. If the location type is a parking spot in 709, then the user may be prompted to specify the type of parking area in 712. If the parking area is a pay lot, then the cost to park may also be entered by the user in 715. The location of the parking spot may then be determined in 718 utilizing the GPS capabilities of the user device 106 and/or vehicle 103. Information about the parking spot may then be sent to the DISS 109 (FIG. 1) in 721 and stored for subsequent access in 724.

If the location type is a drop-off spot in 709, then information about the drop-off location is obtained in 727. For example, the user may be prompted to enter an address and/or business name for the drop-off location. In addition, the user may be prompted to specify entrance information (e.g., main entrance) for the drop-off spot. The location of the drop-off spot may then be determined in 718 utilizing the GPS capabilities of the user device 106 and/or vehicle 103. Information about the drop-off spot may then be sent to the DISS 109 (FIG. 1) in 721 and stored for subsequent access in 724.

Figure 8A:
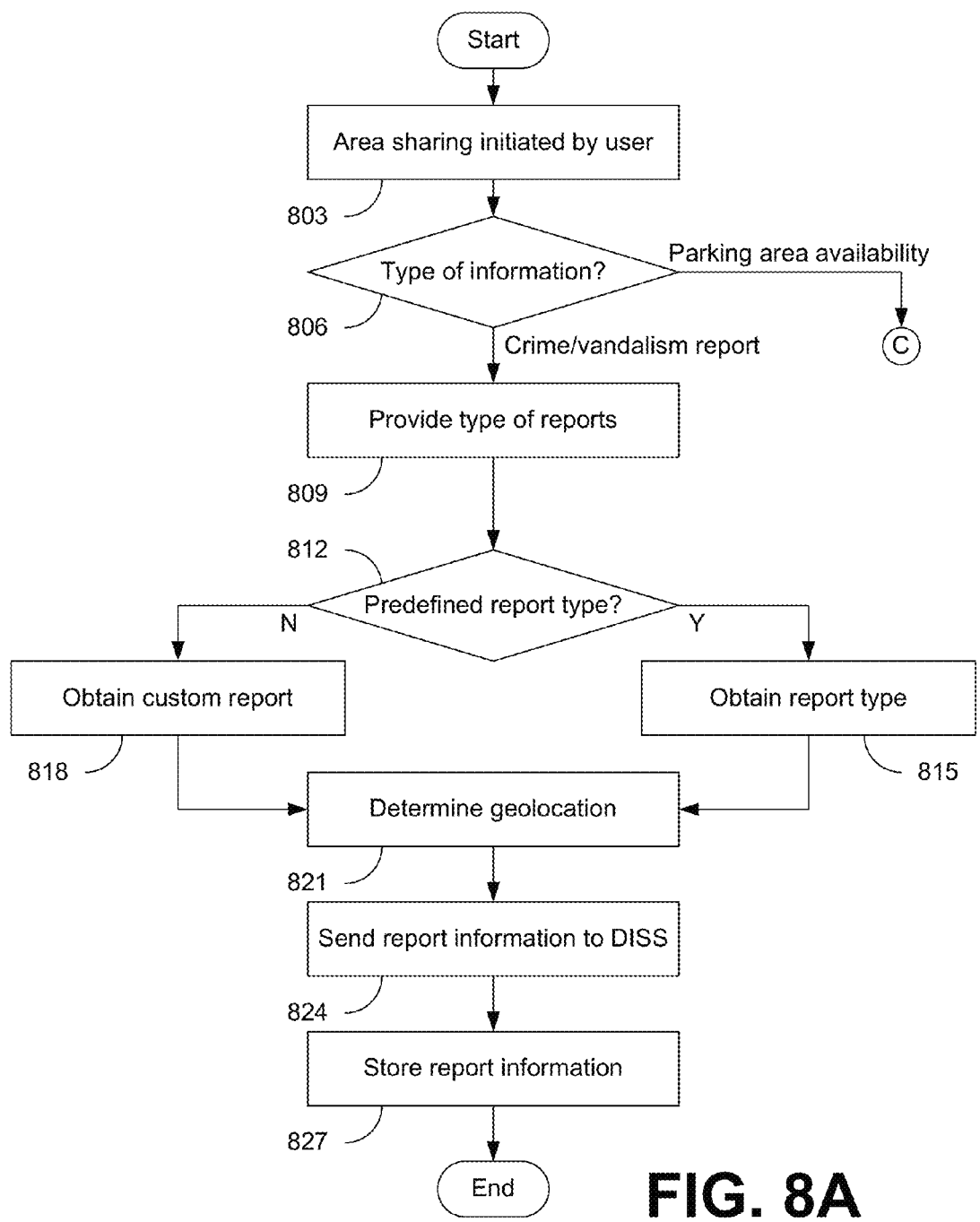
FIGS. 8A and 8B show a flowchart of an example of sharing information about an area with the AIV system of FIG. 1 in accordance with various embodiments of the present disclosure.
Figure 8B:
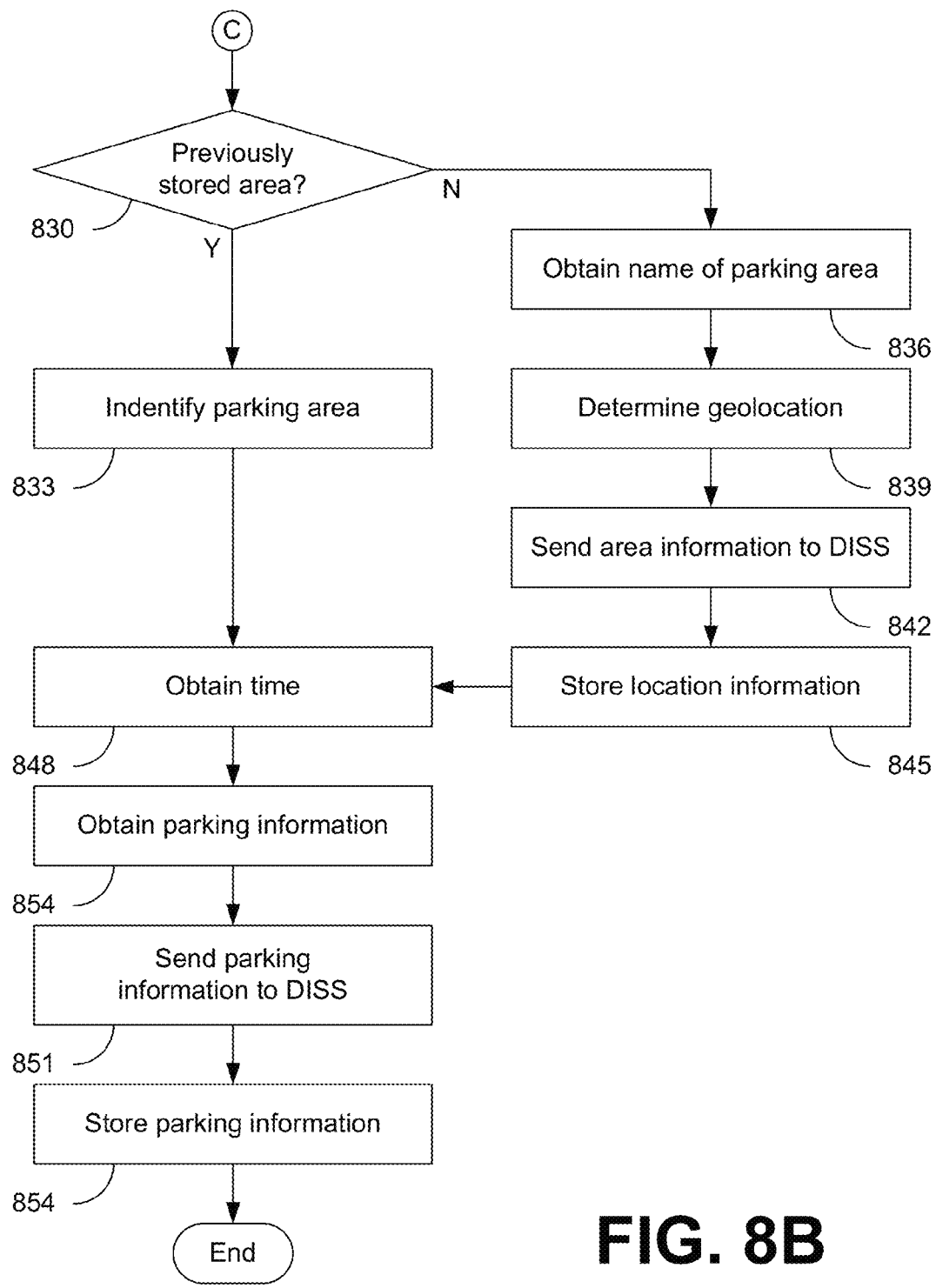

Referring next to FIGS. 8A and 8B, shown is a flowchart illustrating an example of sharing information about an area with the AIV system 100 (FIG. 1). For example, the user may provide information about traffic, parking availability, crimes, incidents, new businesses or other details about an area. Beginning with 803, the user initiates sharing of area information through the application interface on the user device 106 (FIG. 1). In 806, the type of information is determined by, e.g., the user selecting one of a list of predefined information types through the application interface. In the example of FIGS. 8A and 8B, the types of information that can be shared include parking area availability and crime and/or vandalism reporting. If the information type is a crime/vandalism report in 806 of FIG. 8A, then the application interface can provide a list of predefined incident reports in 809. If the desired report is one of the predefined reports in 812, then the user may select the desired incident report in 815. Additional report information may be filled in by the user at that time. If the desired report in not a predefined report in 812, then the application interface allows the user to enter a custom report in 818. Once the report is completed in either 815 or 818, the application interface determines the geolocation using the GPS capabilities of the user device 106. The report information may then be sent to the DISS 109 (FIG. 1) in 824 and stored for subsequent access in 827. The DISS 109 may also be configured to provide a copy of the reports to the appropriate authorities.

If the information type regards parking area availability in 806 of FIG. 8A, then it is determined in 830 (FIG. 8B) if the parking area was previously sent to and/or stored by the DISS 109. If the parking area was previously reported, then the user may identify the parking area through the application interface. For example, the user may select the appropriate parking area from a listing of previously identified parking areas. If the parking area has not been previously stored in 830 by the DISS 109, then the application interface can obtain the name of the parking area in 836 by, e.g., prompting the user to enter the information. In 839, the geolocation of the parking area is determined by using the GPS capabilities of the user device 106. The parking area information is then sent to the DISS 109 in 842 and stored for subsequent access in 845. Once the parking area has been identified in 833 or sent and stored by the DISS 109 in 842 and 845, the time is obtained in 848. The user device 106 may use its internal clock to provide the current time or the user may enter the time. The user may then enter the level of activity for the parking area. For example, the number of available parking spots may be indicated by the user. The user may also specify the activity level by selecting one of a predefined list of activity levels. Other information about the parking area such as, e.g., security may also be provided by the user. The parking area information may then be sent to the DISS 109 in 851 and stored for subsequent access in 854.

Information learned by a vehicle 103 is saved by the DISS 109 and consequently can be made available to all vehicles 103 of the AIV system 100, or even certain individuals or groups of individuals who are also using the AIV system. 100. For example, if a user drove his or her car from out of town or even within town but to an area that he or she haven't been, the vehicle 103 can have information about the area if another user used the system in that area. An example of this functionality is a situation where a user has a mid-day meeting in a very busy and congested area, where he or she is likely to struggle finding parking. If another user of the system has provided the system with information about the difficulties of finding parking in the area or of different areas where parking can be found, the AIV system 100 can inform the user that this is a very busy parking area and offer to valet park the car or direct the user to other possible parking locations. Vehicles will also play a part in this exchange of information, as when the accident reporting system reports to the user that the car has been touched, being broken into or hit by another car, it can also share that information with the web service. This same information sharing can be useful for alternate routing for both manual and autonomous driving, especially in those cases where users have shared corrections to inaccurate GPS routes, and for avoiding parking in an area where the car could possibly be stolen or vandalized.

The functionality of the AIV system 100 is possible because the DISS 109 is context aware. Context awareness is the capability of the AIV system 100 to be aware of its physical environment or situation and respond proactively and intelligently based on that awareness. The DISS 109 can be aware of the GPS positioning of the vehicle 103, and when the vehicle 103 enters an area that has previously been learned, that area's contextual information will be relayed to the processing circuitry or computer inside the vehicle 103 during autonomous driving and to the user during manual driving. When routes are shared, the DISS 109 will also record the time taken driving the route as well as the time when the route was driven, not only when the route is initially recorded, but also during every subsequent time that custom route is driven. Using that semantic data, the AIV system 100 will be able to choose a preferred route during autonomous driving and prioritize suggested routes to give users during manual driving. Similarly, data shared about parking times, pricing, and availability will be used by the system to choose a preferred areas to park during autonomous driving and prioritize suggested parking areas to tell users about during manual driving.

The use of shared navigation data makes it possible for erroneous data to be shared either through human error or malicious users. DISS 109 may mitigate that possible problem by storing the ID of users who share a location. In the event that a user is given erroneous information, the user may report that fact via the application interface on the user device 106. In order to account for the possibility of users incorrectly marking data as erroneous, DISS 109 may operate according to a '3 strikes and out' policy. If a piece of submitted navigation information is marked as erroneous 3 times, that data is removed from the datastore. In addition, the user who uploaded that erroneous data may be given their first strike. If a user has been flagged for sharing erroneous data for a predefined number of times (e.g., three), that user may be restricted from sharing information with the DISS 109.

The AIV system 100 also supports an intelligent collision avoidance system (iCAS). The collision avoidance system is a vehicle-independent system that is used to intelligently determine the difference between humans, animals, and other objects that may be in or that may enter into the path of the vehicle 103. When a collision can not be avoided, the system determines the "best" object to collide with after determining the classification of the living object. The system resolves which collision minimizes, in the order of precedence, the loss of human life, then the loss of animal life and next damage to the environment.

The collision avoidance system makes use of sensory data from cameras, ultrasonic sensors, line following sensors, and thermal sensors to achieve its goals. Other sensors that may be used include, but are not limited to, laser range finders and other distance sensors, Lidar, stereo cameras, audio sensors, gyrometer, infrared sensors, photosensitive sensors, GPS units and tracking systems, etc. After collecting data from the sensors, the collision avoidance system employs artificial intelligence techniques such as fuzzy logic, neural network, and/or convolutional neural networks to determine the difference between human and animals, and then to determine which one to impact or avoid. The collision avoidance system can be implemented by processing circuitry of the vehicle 103 (e.g., computer systems, super computers, microcontrollers and/or external memory).

Photosensitive sensors may be used primarily for lane detection while thermal sensors can be used to give thermal readings for objects in the vehicle's path. The collision avoidance system may also use ultrasonic sensors and laser range finders, in their ability to ascertain distance information, for object avoidance. The collision avoidance system is dependent on the vehicle's ability to properly detect objects, road signs, traffic lights and other bodies. As a result, an independent vision system can used. Data from the vision system may be used to collect stereovision quality picture data that can be fed to processing circuitry such as, e.g., a microcontroller for processing. The vision system contains, but is not limited to, stereo cameras, microcontrollers and connective components. Positional data to keep track of the vehicle 103 and the user at various locations is also gathered. GPS units in the vehicle 103 and user device 106 may be used to retrieve positional data. In some implementations, radio frequency identification (RFID) readers and RFID tags may be used to increase the accuracy of the positional data that will be received from the GPS unit.

Neural networks have been successfully employed in autonomous vehicle navigation. Neural networks utilize computational methods that have been derived to mimic the brain through the use of highly interconnected, processing elements which give them learning capabilities and enable them to recognize and understand, subtle or complex patterns. A neural network is a mathematical model that resembles a biological network in structure and functionality. It is an adaptive system that allows the network to change its structure based on data transmitted through it during its learning phase. After the network learns during the learning phase, it can then be used to predict future outcomes when fed with relevant data.

Neural networks can be employed by the collision avoidance system to identify human objects based upon, e.g., their different shapes, different body structures, different postures, different poses, different light intensities, different ethnicity, different activities, different movement and/or velocities in the area of the vehicle, and/or different locations in the road. Non-human living objects such as animals may be identified based upon, e.g., their different shapes, different body structures, different colors, different activities, and/or different movement and/or velocities in the area of the vehicle. Combinations of humans and animals may also be identified based upon, e.g., their different shapes, different body structures, different colors, different activities, and/or different movement and/or velocities in the area of the vehicle. Based on the neural network learning the above properties of both animate and inanimate objects in the vicinity of the vehicle, the collision avoidance system can tailor a response to the identification.

Fuzzy logic can also be employed in vehicle control. Fuzzy logic is an artificial intelligence technique that recognizes that a statement is not only evaluated to be true or false but can also be varying degrees of both values. Fuzzy logic can take the vehicle automation a step further by including certain aspects of human intelligence into the design. Fuzzy logic and fuzzy theory can provide a set of rules that may be used to decide which living object classification the object falls into. In addition to classifying objects, Fuzzy logic and fuzzy theory may be used, in the event that the information is not complete, to make a decision about which object, if any, should be collided with.

The combination of neural networks and fuzzy logic provides the collision avoidance system with the ability to identify and/or distinguish between human objects, irrespective of human shape or activity, and non-human living objects like animals with a high level of detection accuracy. Based on the living object classification, a determination can made about which object should be collided with to minimize, firstly, the amount of human loss, secondly the animal life loss and thirdly, environmental damage. In cases where sensory data is incomplete or partial due to limitations of the environment or sensors, fuzzy logic and fuzzy theory techniques can be employed to make the final decision as to whether an impact should be made and with which object.

Figure 9:
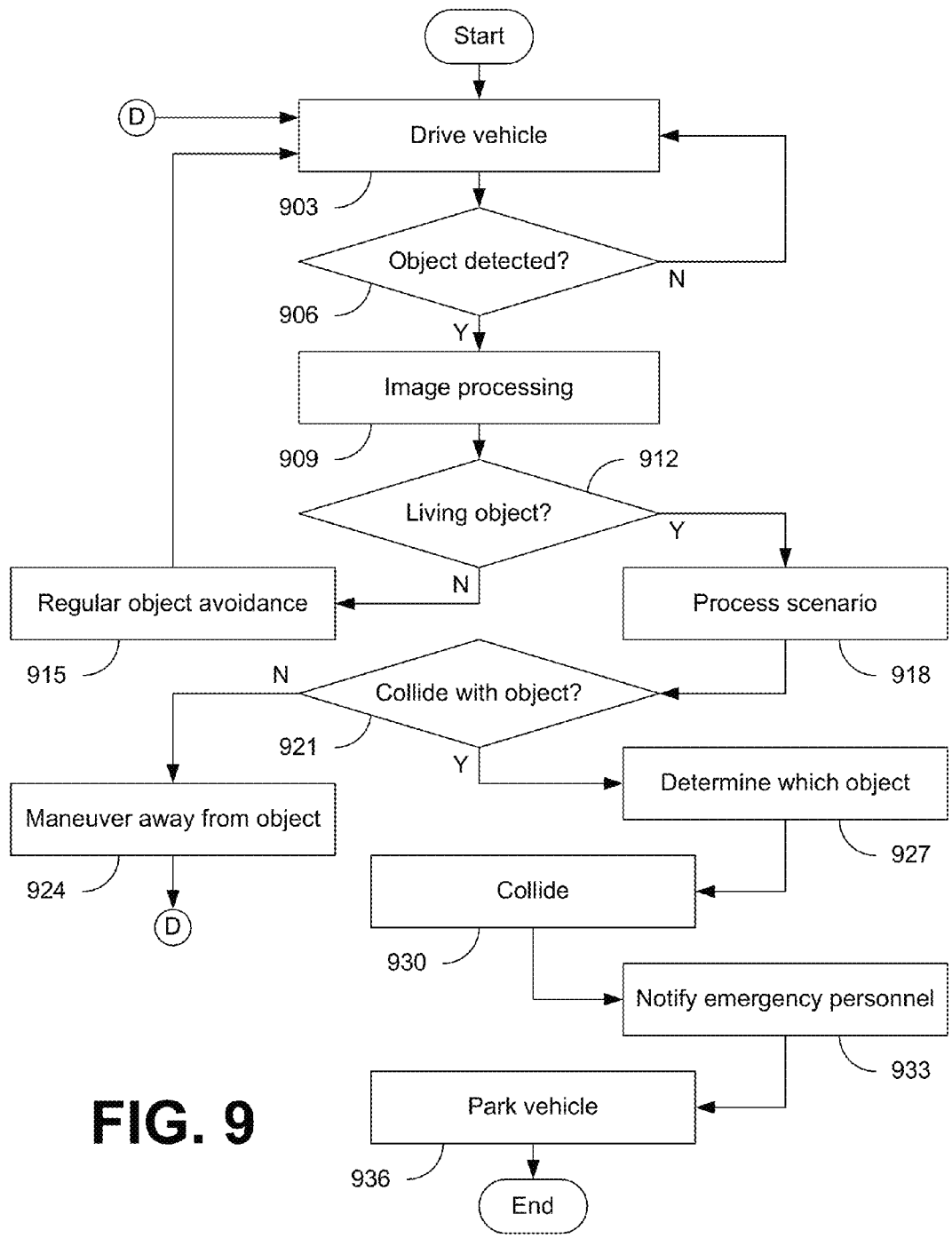
FIG. 9 is a flowchart illustrating an example of a collision avoidance system that can be implemented in a vehicle of the AIV system of FIG. 1 in accordance with various embodiments of the present disclosure.

Referring to FIG. 9, shown is a flowchart illustrating an example of the collision avoidance system that can be implemented in a vehicle 103 of the AIV system 100 (FIG. 1). Beginning with 903, the collision avoidance system is active while the vehicle is autonomously driving. Processing circuitry of the vehicle 103 monitors sensors installed in the vehicle 103 to determine whether an object is detected in 906. If an object is detected in the path of the vehicle 103 or may enter the path of the vehicle 103, a vision system processes one or more images in 909 to determine if it is a living object. If the detected object is not a living object in 912, then the vehicle 103 can operate with available object avoidance algorithms in 915 before continuing operation in 903.

If it is determined in 912 that a living object has been detected, then the collision avoidance system processes the scenario to determine if the vehicle 103 should collide with the object. If it is determined in 921 that a collision can be avoided, then in 924 the vehicle 103 maneuvers away from the object before returning to 903. If a collision cannot be avoided in 912, then it is determined in 927 which object is best to collide with in 930. After the collision, the collision avoidance system can initiate a call to emergency services in 933 and safely park the vehicle 103 in 936. In some implementations, the vehicle 103 may be parked in 936 without emergency services being contacted in 933 if no injury has occurred.

The AIV system 100 also supports an intelligent accident reporting system (iARS). The accident reporting system detects if, while the vehicle is parked or idling or even in motion, an external entity tampered with the body or other portion of the vehicle 103 (FIG. 1). Using audio and visual sensors, accident reporting system can record parties involved with the contact and an incident report may be sent to the user informing him or her of possible damage to the vehicle. For example, sensors of the accident reporting system may remain in a hibernation state until an incident or activity is detected, at which time the sensors are fully turned on. Activities that can activate the accident reporting system include, but are not limited to, other vehicles hitting the vehicle 103, humans and/or animals touching and/or damaging the vehicle 103, vandalism to the vehicle 103, theft of the vehicle 103, and/or foreign objects falling on the vehicle 103. Sensors can include, cameras (mono and/or stereo), laser range finders, Lidar, gyrometer, infrared sensors, thermal sensors, etc. Processing circuitry (e.g., a computer or other processing device) in the vehicle 103 may control and monitor the sensors.

When an incident is detected, data is collected from the sensors and the accident reporting system determines what type of activity is happening around the car by assessing the data. The accident reporting system informs the user of the type of activity (e.g., when vehicle is touched, being broken into and/or hit by another car) through the application interface on the user device 106. The user may then view data from the vision, sound and thermal sensors to determine whether to call the authorities, press the panic button for the vehicle 103, or do nothing or any combination of those responses. The accident reporting system may be configured to automatically contact authorities about the incident when approved by the user. The user can define which activities they want to be informed about. For instance, a user can configure the accident reporting system to report burglary attempts, foreign object interference with the vehicle, if another car hits the vehicle, or any combination thereof.

When an incident (e.g., a collision or interference) is detected, the vision system of the vehicle 103 takes pictures and/or video recordings of surroundings and the audio system records sounds made around the time of detection or interference. The data collected from detection of the incident can be recorded analyzed and used to generate an incident report. This report is sent to the user via the user device 106. The incident report can contain screen shots and/or video of the incident with probable perpetrators along with any audio that was recorded using an installed microphone during the incident.

Figure 10:
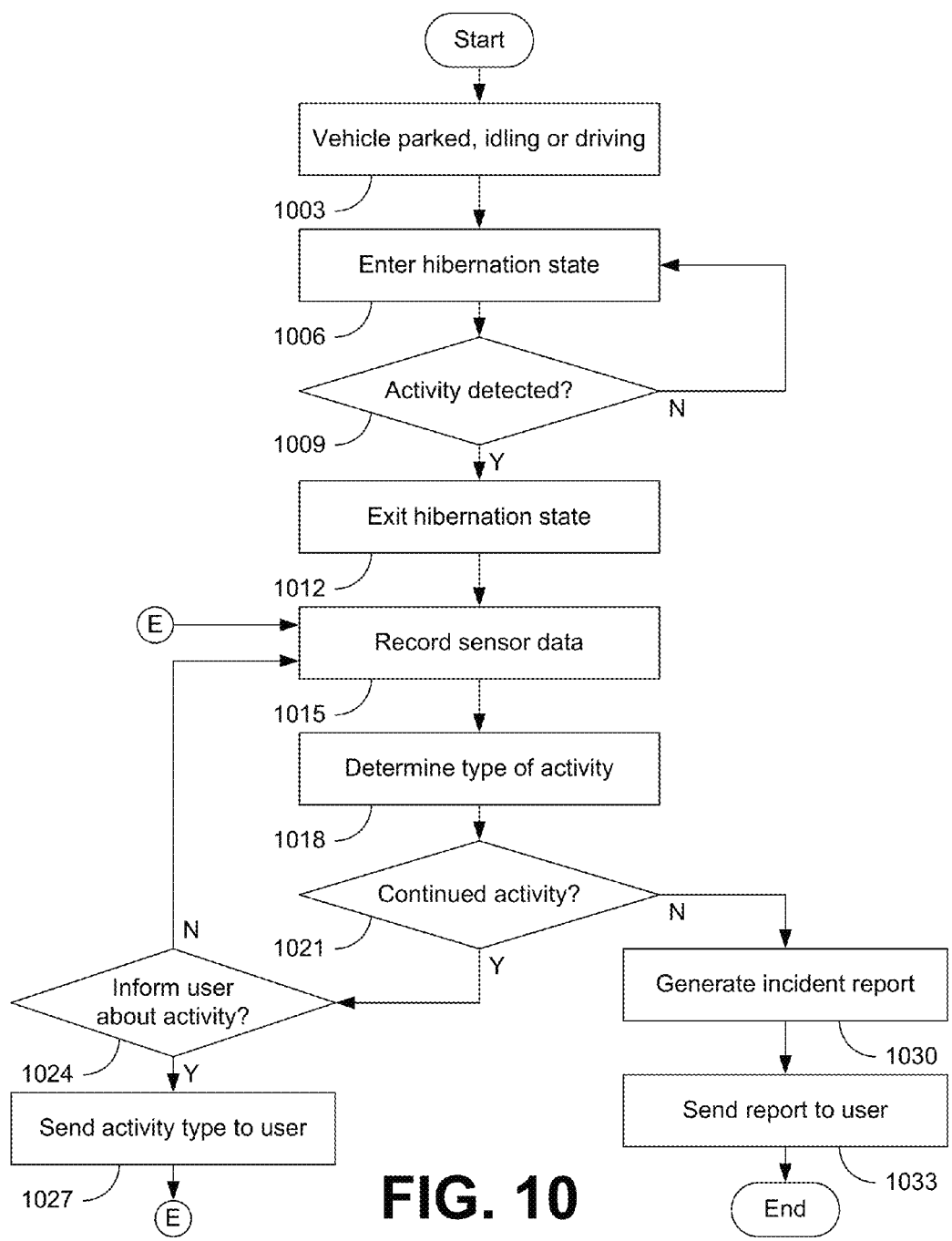
FIG. 10 is a flowchart illustrating an example of an accident reporting system that can be implemented in a vehicle of the AIV system of FIG. 1 in accordance with various embodiments of the present disclosure.

Referring to FIG. 10, shown is a flowchart illustrating an example of the accident reporting system that can be implemented in a vehicle 103 of the AIV system 100 (FIG. 1). Beginning with 1003, the collision avoidance system is active while the vehicle is in a parked position, stationary, driving or idling. In 1006, the accident reporting system enters a hibernation state or mode to reduce power consumption of the sensors. If an activity or incident is detected in 1009, then the accident reporting system exits the hibernation state in 1012 and the sensors are fully powered up. For example, the accident avoidance system may detect movement of the vehicle 103 or an impulse caused by an impact with the vehicle 103. The accident reporting system then begins recording the sensor data in 1015. The sensor data may be recorded for a predefined interval such as, e.g., one minute.

The type of activity is determined by the accident reporting system in 1018 based upon the recorded data and other indications from the vehicle systems. For example, the video images may be used to identify whether the accident is cause by an individual, animal, another vehicle, or other object. Characteristics of the movement and/or impact may also be used to determine the type of accident. If the activity continues in 1021, then accident reporting system determines if the user wants to be informed about the identified activity type in 1024 by viewing the user's predefined preferences. If so, then the accident reporting system notifies the user of the activity type by sending a notification to the user device 106. The accident reporting system continues recording the sensor data in 1015. If the activity has stopped in 1021, an incident report is generated in 1030, which is sent to the user via the user device 106 in 1033 or via email or a privately accessed web application. The format of the incident report may be predefined by the user and may include at least a portion of the recorded sensor data.

The AIV system 100 also supports a gradual intelligent route learning (GIRL) to allow the AIV system 100 to learn driving patterns and/or preferences of the user. For instance, gradual intelligent route learning may learn that the user prefers routes with less stop signs, traffic lights or even pedestrians. It may also realize that the user prefers to drive through particular areas while going to work and go along other routes when returning from work. Frequently travelled paths are learned by the system. This enables the vehicle 103 to be perceptive to the roads the user prefers to use even if it does not take the user on the shortest path to the destination or in the shortest time to the destination. Other driving characteristics of the user may also be learned such as, e.g., how the user accelerates and decelerates, the side of the road preferred when driving in different areas (e.g., if it is a multiple lane highway or a one lane highway), the distance the vehicle is from either edge of the lane, how the user avoided pot holes in the road, the distance between the vehicle and other vehicles around it, speed preferences during different segments of road, and during which times of the day does the user prefer to drive certain routes in comparison to other routes.

The user may configure the gradual intelligent route learning to determine how often a path must be travelled to have the route's driving preferences learned by the AIV system 100. For example, a default setting may be three times per week to trigger the gradual intelligent route learning to remember driving preferences for that route. Processing circuitry within the vehicle 103 stores travel information and learned user preferences. For instance, the vehicle activity may be tracked using, e.g., GPS tracking, camera imaging, laser range finding, and/or Lidar information over a defined time period (e.g., a week). The activity information may be stored in memory by the processing circuitry (e.g., a computer) and evaluated by the gradual intelligent route learning to determine if a route and/or driving preferences are to be learned. The learned routes and preferences may be sent to the DISS 109 for storage and use when the DISS 109 determines recommendations for the user. These routes and preferences may also be used by the vehicle 103 for autonomous operation.

Figure 11:
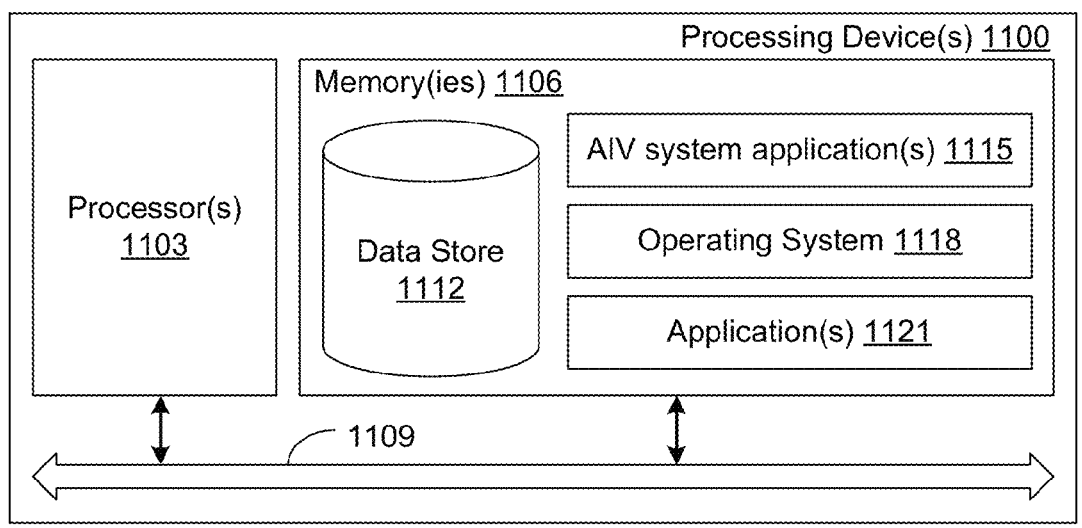
FIG. 11 is a schematic block diagram that provides one example illustration of a processing device employed in the AIV system of FIG. 1 in accordance with various embodiments of the present disclosure.

With reference now to FIG. 11, shown is a schematic block diagram of a processing device 1100 that may be used to implement various portions of the AIV system 100 of FIG. 1 in accordance with various embodiments of the present disclosure. The processing device 1100 may include, e.g., a computer and/or microprocessor included in a vehicle 103, the user device 106, and/or a server supporting the DISS 109 (FIG. 1). The processing device 1100 includes at least one processor circuit, for example, having a processor 1103 and a memory 1106, both of which are coupled to a local interface 1109. To this end, the processing device 1100 may comprise processing circuitry such as, for example, at least one computer, tablet, smart phone, or like device. The local interface 1109 may comprise, for example, a data bus with an accompanying address/control bus or other bus structure as can be appreciated. The processing device 1100 can include a display for rendering of generated graphics such as, e.g., a user interface and an input interface such, e.g., a keypad or touch screen to allow for user input. In addition, the processing device 1100 can include communication interfaces (not shown) that allow the processing device 1100 to communicatively couple with other devices such as, e.g., communication interfaces included in a vehicle 103, a user device 106, and/or devices supporting the DISS 109. The communication interfaces may include one or more wireless connection(s) such as, e.g., Bluetooth or other radio frequency (RF) connection and/or one or more wired connection(s).

Stored in the memory 1106 are both data and several components that are executable by the processor 1103. In particular, stored in the memory 1106 and executable by the processor 1103 are AIV system application(s) 1115, an operating system 1118, and/or other applications 1121. AIV system applications can include applications that support, e.g., autonomous passenger retrieval, autonomous parking, intelligent collision avoidance, intelligent accident reporting, gradual intelligent route learning, remote cabin control, and/or distributed information sharing. It is understood that there may be other applications that are stored in the memory 1106 and are executable by the processor 1103 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, Matlab or other programming languages and their libraries.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors 1103 and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the AIV system application(s) 1115, the operating system 1118, application(s) 1121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-10 show the functionality and operation of an implementation of portions of the AIV system application(s) 1115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowcharts of FIGS. 3-10 show a specific order of execution, it is understood that the order of execution may differ from that which is depicted. For example, the order of execution of two or more blocks may be scrambled relative to the order shown. Also, two or more blocks shown in succession in FIGS. 3-10 may be executed concurrently or with partial concurrence. Further, in some embodiments, one or more of the blocks shown in FIGS. 3-10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the AIV system application(s) 1115 and/or application(s) 1121, that comprises software or code can be embodied in any non-transitory computer-readable medium for use by or in connection with an instruction execution system such as, for example, a processor 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A distributed information sharing system (DISS), comprising:
   at least one processing device; and
   an information sharing system executable in the at least one processing device, the information sharing system comprising:
      logic that obtains route information associated with a geographic area;
      logic that stores the route information in a data store; and
      logic that communicates the route information stored in the data store to a user vehicle in response to a request from a user device.

2. The DISS of claim 1, wherein the route information is obtained from the user device.

3. The DISS of claim 2, wherein the user device is a cellular phone.

4. The DISS of claim 1, wherein the route information is obtained from the user vehicle.

5. The DISS of claim 2, wherein the route information includes a route that was recorded by the user device during transit along that route.

6. The DISS of claim 2, wherein the route information includes a user defined route.

7. The DISS of claim 1, wherein the route information includes a parking location associated with the geographic area.

8. The DISS of claim 1, wherein the route information includes parking patterns associated with the geographic area, where the parking patterns are associated with dynamic patterns of vehicle parking in the geographic area.

9. The DISS of claim 1, wherein the route information includes criminal activity associated with the geographic area.

10. The DISS of claim 1, wherein the request is a request from the user of the user vehicle for the route information associated with the geographic area.

11. The DISS of claim 1, wherein the request is an open request to send the route information associated with the geographic area to the user vehicle when the route information has been obtained by the at least one processing device.

12. An accident reporting system, comprising:
   a plurality of sensors distributed about a motor vehicle;
   a monitoring system configured to:
      determine an occurrence of a violation of the motor vehicle based upon sensory data from the plurality of sensors;
      responsive to the determination of the violation, obtain audio and visual recordings of an environment surrounding the motor vehicle using the plurality of sensors;
      identify a violation type associated with the violation based at least in part upon the audio and visual recordings; and
      responsive to the violation type, report the violation to a reporting authority.

13. The accident reporting system of claim 12, wherein the reporting authority is a user of the motor vehicle.

14. The accident reporting system of claim 12, wherein the reporting authority is a service provider who reports the violation to an owner of the motor vehicle.

15. The accident reporting system of claim 13, wherein the monitoring system is configured to report the violation to local law enforcement in response to an indication from the user.

16. The accident reporting system of claim 12, wherein the violation is a collision with another motor vehicle.

17. The accident reporting system of claim 12, wherein the violation is vandalism of the motor vehicle.

18. The accident reporting system of claim 12, wherein the violation is theft of the motor vehicle.

19. The accident reporting system of claim 12, wherein the monitoring system is configured to generate an incident report of the violation in response to cessation of the violation, the incident report including at least a portion of the obtained audio and visual recordings.

20. The accident reporting system of claim 12, wherein identifying the violation type comprises determining whether a cause of the violation is an individual, an animal, or another vehicle.

* * * * *